United States Patent
Boenigk

(10) Patent No.: US 6,184,635 B1
(45) Date of Patent: Feb. 6, 2001

(54) CIRCUIT ARRANGEMENT FOR STARTING AND FOR OPERATING HIGH-PRESSURE LAMPS

(75) Inventor: Michael Boenigk, Berlin (DE)

(73) Assignee: Patent-Treuhand-Gesellschaft fuer elektrische Gluehlampen mbH, Munich (DE)

( * ) Notice: Under 35 U.S.C. 154(b), the term of this patent shall be extended for 0 days.

(21) Appl. No.: 09/572,579

(22) Filed: May 17, 2000

(30) Foreign Application Priority Data

May 20, 1999 (DE) ................................. 199 23 265

(51) Int. Cl.$^7$ ........................................................ G05F 1/00
(52) U.S. Cl. .................... 315/291; 315/200 R; 315/128; 315/289; 315/DIG. 5; 315/DIG. 7
(58) Field of Search ................ 315/291, 200 R, 315/227 R, 238, 243, 246, 265, 273, 276, 289, 290, 128, 173, DIG. 5, DIG. 7

(56) References Cited

U.S. PATENT DOCUMENTS

| | | | |
|---|---|---|---|
| 4,339,695 | * 7/1982 | Siglock | 315/276 |
| 4,392,081 | * 7/1983 | Brown et al. | 315/46 |
| 4,935,672 | * 6/1990 | Lammers et al. | 315/200 R |
| 4,994,716 | * 2/1991 | Ganser et al. | 315/200 R |
| 5,680,015 | * 10/1997 | Bernitz et al. | 315/291 |
| 5,739,644 | * 4/1998 | Bernitz et al. | 315/289 |
| 5,942,883 | * 8/1999 | Preis et al. | 323/282 |

FOREIGN PATENT DOCUMENTS 34 26 491 A1    2/1985  (DE) .

* cited by examiner

*Primary Examiner*—Haissa Philogene
(74) *Attorney, Agent, or Firm*—Carlo S. Bessone

(57) ABSTRACT

A circuit arrangement for starting and for operating high-pressure lamps makes an increased transfer voltage available to the discharge lamp. The increased transfer voltage is generated by voltage doubling across a rectifier unit by means of a charging capacitor (LK), separated into two individual capacitors (C1, C2), the common midpoint (M) of the capacitors (C1, C2) being connected to the two network inputs of the rectifier unit.

12 Claims, 7 Drawing Sheets

CIRCUIT ARRANGEMENT FOR STARTING AND FOR OPERATING HIGH-PRESSURE LAMPS

This application is closely related to the simultaneously submitted application with the internal file reference 99 P 5529.

TECHNICAL FIELD

The invention proceeds from a circuit arrangement for starting and for operating high-pressure lamps. Particularly at issue here are high-pressure and extra-high-pressure discharge lamps which are becoming increasingly widespread in all sectors of lighting engineering, because of their good luminous efficiency. Owing to their specific properties, they are mostly difficult to start and operate. This holds, in particular, for sodium high-pressure lamps with a relatively high xenon pressure. Because of their outstanding luminous efficiency, these lamps are particularly well suited for street lighting. In this case, they frequently replace existing systems with a substantially lower efficiency, for example mercury-vapor lamps. In addition, in this formulation of the problem, it is also necessary to solve the problem of power reduction (in conjunction with an identical luminous flux), the result of all this being a saving in energy.

PRIOR ART

DE-A 34 26 491 has already disclosed a circuit arrangement for starting and for operating high-pressure lamps, in which a series element is connected downstream of the dc output of the rectifier unit either directly or at most via a series element. The former series element contains an inductive filter in addition to the high-pressure discharge lamp. It is therefore possible to start lamps with a high cold filling pressure only with difficulty.

The problem of the difficult starting of high-pressure discharge lamps, in particular in the case of the sodium high-pressure lamps, has so far been solved in very different ways. More detail on this is to be found in the parallel application.

Specific starting aids have the disadvantage that they are not always adequate.

Very wide, high-energy starting pulses have the disadvantage of large, complicated and expensive starting inductors in the electronic ballast.

When providing increased transfer voltages with the aid of step-up converters, additional high-frequency transformers etc., the disadvantage occurs that this is technically complicated and cost intensive. Substantial losses occur in the components when there is a permanently applied high intermediate circuit voltage. Moreover, it is necessary to use overdimensioned components.

Starting gas mixtures have the disadvantage of worsening the lighting properties of the lamp.

SUMMARY OF THE INVENTION

It is the object of the present invention to provide a circuit arrangement as defined in the preamble of claim 1 which permits quick and simple starting of the high-pressure lamp, in particular in the case of systems without active harmonic filters.

This object is achieved by means of the characterizing features of claim 1. Particularly advantageous refinements are to be found in the dependent claims.

Because of their high luminous efficiency, high-pressure and extremely high-pressure discharge lamps are spreading increasingly in all fields of lighting technology. Starting and operating them is, however, frequently problematical because of their specific properties. This holds, for example, in particular for sodium high-pressure lamps with very high xenon pressures (cold filling pressure above 1 atm, in particular in the case of approximately 2 atm). These lamps are particularly suitable for street lighting because of their outstanding luminous efficiency. In order to achieve a further energy saving (also in the ballast), electronic operation of these lamps is being increasingly targeted. However, circuit variants for the electronic ballasts which are technically very complicated and in part cost intensive are required to ensure the required parameters as regards starting voltage, transfer voltage, harmonic content etc. This holds, in particular, for starting these lamps.

The proposed circuit arrangement is suitable, in particular, for use for systems without additional active harmonic filtering. This is the case whenever only small charging capacitors or none at all, are used in the electronic circuit. It permits high-pressure lamps which would otherwise be very difficult to start to be started and transferred with the aid of an exceptionally low technical outlay.

According to the invention, the object is achieved by means of a circuit arrangement in which in order to transfer the discharge arc after completed break down, the lamp is provided with a transfer voltage which is higher than the customary no-load voltage. Lacking a substantial circuit outlay, the no-load voltage is normally the peak value of the line ac voltage. This increase is realized by raising, in particular doubling, the intermediate circuit voltage. After completed transfer of the lamp, the intermediate circuit voltage drops again to the normal value of the (rectified) line ac voltage.

The circuit arrangement differs from the customary designs in that it is technically very simple and thus can be implemented in an extremely cost effective way. It manages without the otherwise customary active components such as step-up converters, charging pumps etc., or additional high-frequency transformers. After a completed transfer, there are no longer any increased intermediate circuit voltages in the lamp operation, as a result of which the internal losses of the circuit are reduced.

FIGURES

The invention is to be explained below in more detail with the aid of a plurality of exemplary embodiments. In the drawing:

FIG. 1 shows the outline circuit diagram of a circuit arrangement according to the invention, and FIGS. 2 to 7 show further exemplary embodiments of a circuit arrangement.

DESCRIPTION OF THE DRAWINGS

The basic circuit design is illustrated in FIG. 1. The lamp L to be started and operated therewith is, for example, a sodium high-pressure lamp with a power of 70 W. The circuit arrangement comprises four circuit blocks.

Firstly, the line voltage (240 V) present between the terminals CE1 and CE2 is filtered by means of the switching circuit NF. This is not mandatory for the functioning of the circuit arrangement according to the invention. The first circuit block can, however, comprise still further switching means such as a phase-gating or phase-cutting circuit (preferably by means of a triac or thyristor) and, possibly, a current-limiting inductor.

Thereafter, line rectification is performed by means of a Grätz bridge GB, as known per se.

According to the invention, as voltage doubler connection the downstream charging capacitor LK is split up into two separate capacitors C1, C2, which are preferably of the same size, the common midpoint M of the two capacitors being connected to one of the two network inputs of the Grätz bridge. The respective other contact of the two capacitors is connected to the frame potential or positive potential of the rectified line voltage. This produces a voltage doubler connection which, in the unloaded state when the lamp has not yet started, provides the peak value of the doubled network input voltage, that is to say $$U_{0max\_unloaded} = 2\sqrt{2} U_{line\_eff}.$$

A further circuit is provided for current limitation SB and a starting device ZE is provided downstream of the charging capacitor block LK. A half bridge or full bridge with a radio-frequency inductor is normally used for current limitation. The starting device is preferably a superimposed starting circuit. Further current-limiting components (inductors) can be connected upstream of the circuit.

The loadability of the voltage doubler connection is directly proportional to the capacitance of the capacitors C1, C2, that is to say when a load current $I_L$ is flowing the (peak) voltage $U_0$ drops to a minimum value of $$`U_0 = \sqrt{2} U_{line\_eff}.$$

This effect can be used specifically to set the intermediate circuit voltage $U_0$ so that during operation of the lamp the losses at the active electronic components and inductors (for example in the case of half-bridge or full-bridge circuits) are as low as possible. The intermediate circuit voltage is present at the output of the Grätz bridge between the frame thereof and the positive pole or negative pole thereof. It is intended to be only as high as absolutely necessary during operation of the lamp.

The capacitance values for the capacitors C1, C2 are therefore essentially determined by the required power to be output (for example for the starting device) in the operating state, which is between once and twice the network input voltage (when the lamp is not started, $U_0$ is equal to the transfer voltage for the lamp), and the voltage $U_0$ required for the operating state $$U_0 \geq \sqrt{2} U_{line\_eff} \text{(lamp burns)}.$$

Figure 1:
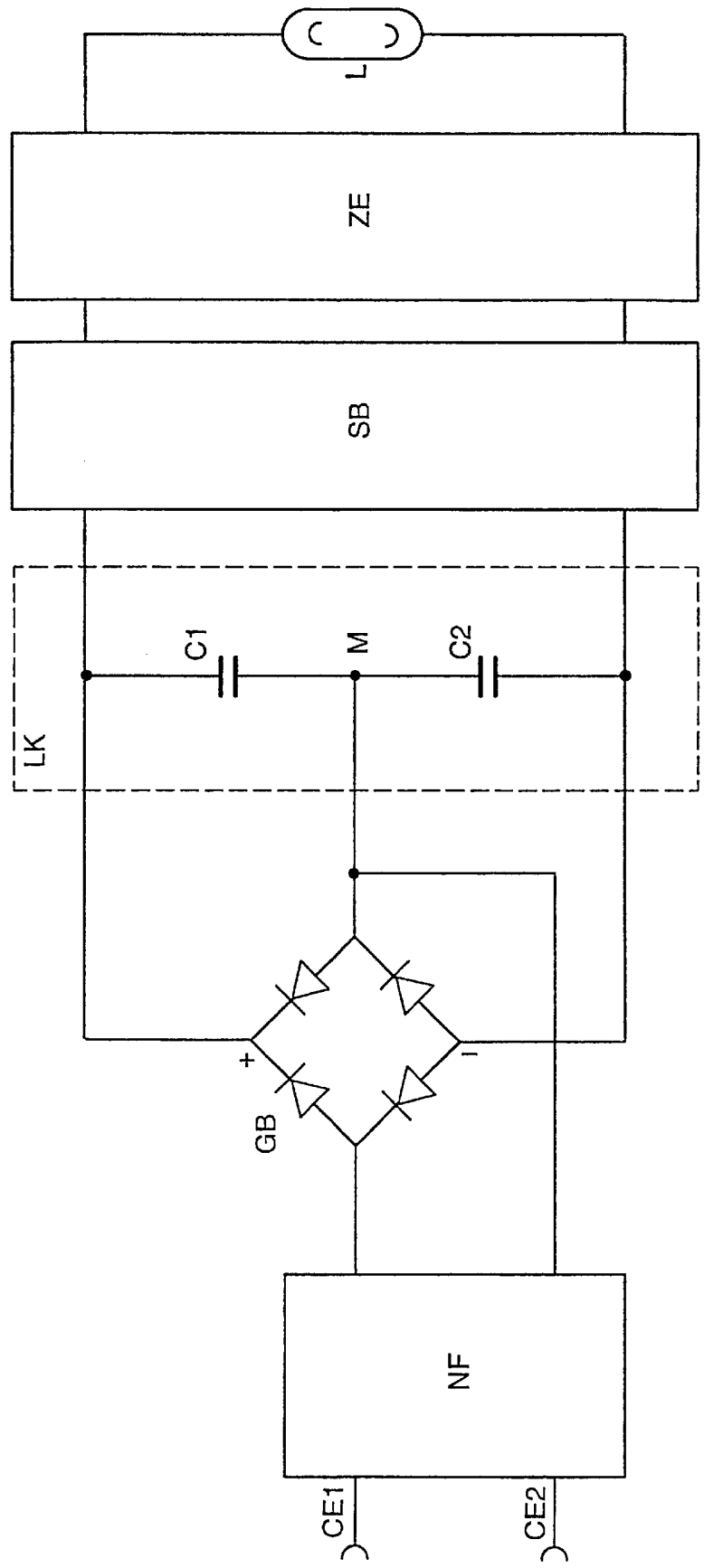
Figure 2:
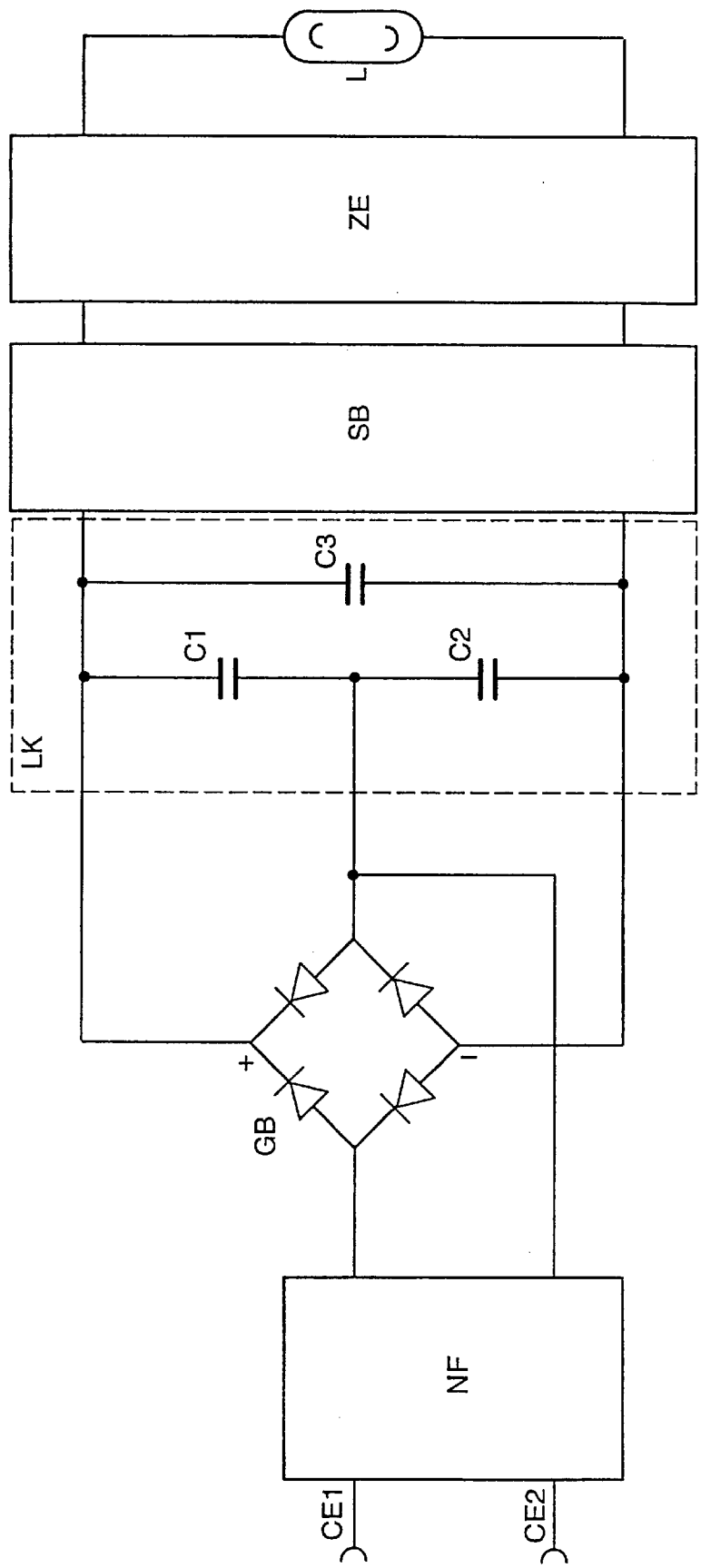

In cases when a larger capacitance is desired for the overall charging capacitor block LK than in accordance with the abovenamed dimensioning conditions, it is possible to insert, an additional capacitor C3 (see FIG. 2), preferably not split up, in parallel with C1 and C2. Said capacitor is charged up in the unloaded circuit (lamp not started) to the increased voltage $$2\sqrt{2} U_{line\_eff} \geq U_0 > \sqrt{2} U_{line\_eff}$$

in accordance with the parameters of C1, C2. There is thus available for the transfer an appropriately high voltage with a large energy reserve (in accordance with the values of the capacitors C1, C2 and C3). Consequently, appropriate smoothing of the rectified line voltage is possible during operation of the lamp. In case of very small capacitance values of the capacitors C1, C2, C3, the result (in some circumstances) is a pulsating dc voltage for the flow of a load current $I_L$ (when the lamp is burning).

Figure 3:
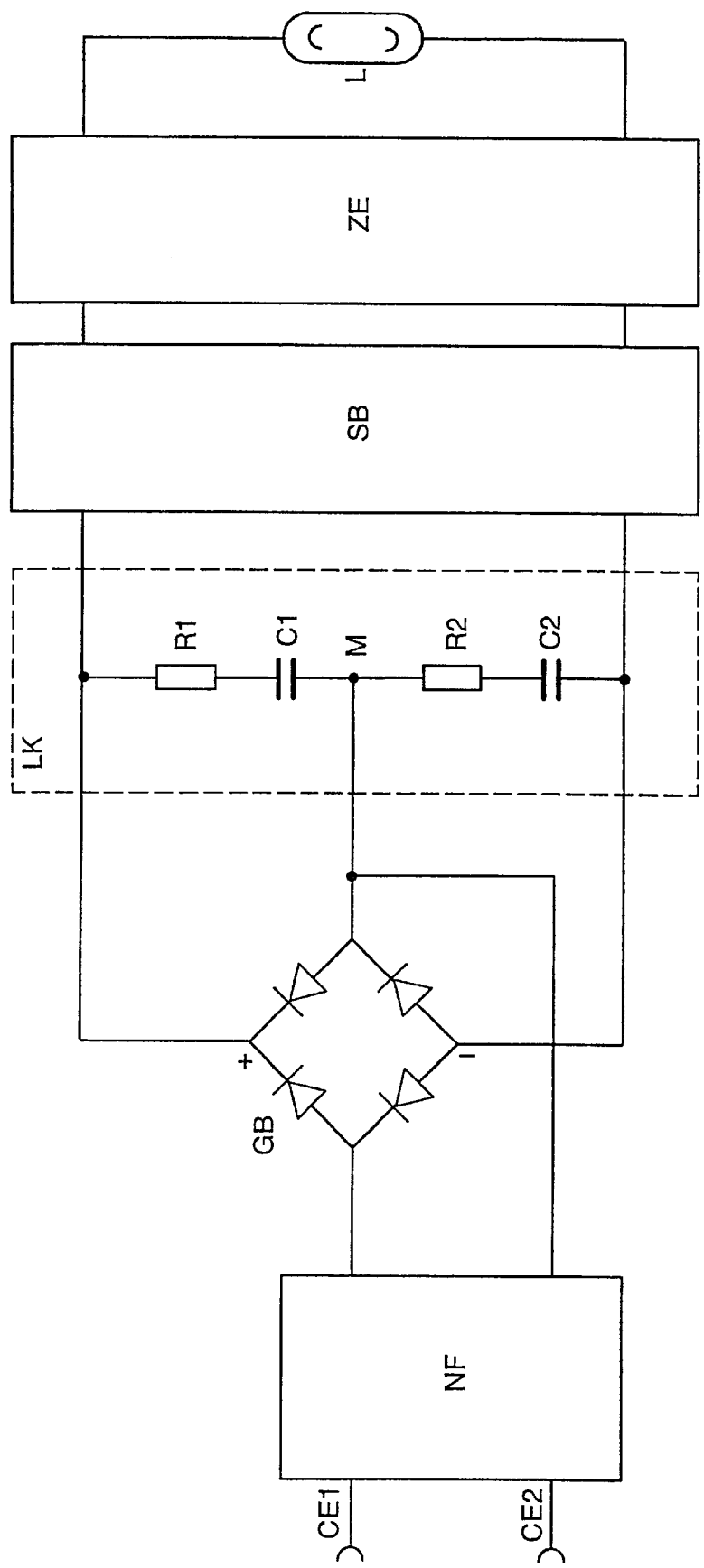

If it is necessary to set the increased voltage $U_0$ in the operating state of "lamp not started", a current-limiting component (for example a resistor R1 or R2, respectively) can be inserted in each case (see FIG. 3) additionally in series with C1 or C2, respectively. Said component can be used to set the voltage rise (in accordance with the loading by, for example, the starting device) within the limits $$2\sqrt{2} U_{line\_eff} \geq U_0 > \sqrt{2} U_{line\_eff}.$$

It holds that:

$$U_0 = 2\sqrt{2} U_{line\_eff}$$

for R1 and R2 tending to zero. On the other hand, it holds that:

$$U_0 = \sqrt{2} U_{line\_eff}.$$

for R1 and R2 tending to ∞, with $I_L$ tending to zero.

Figure 4:
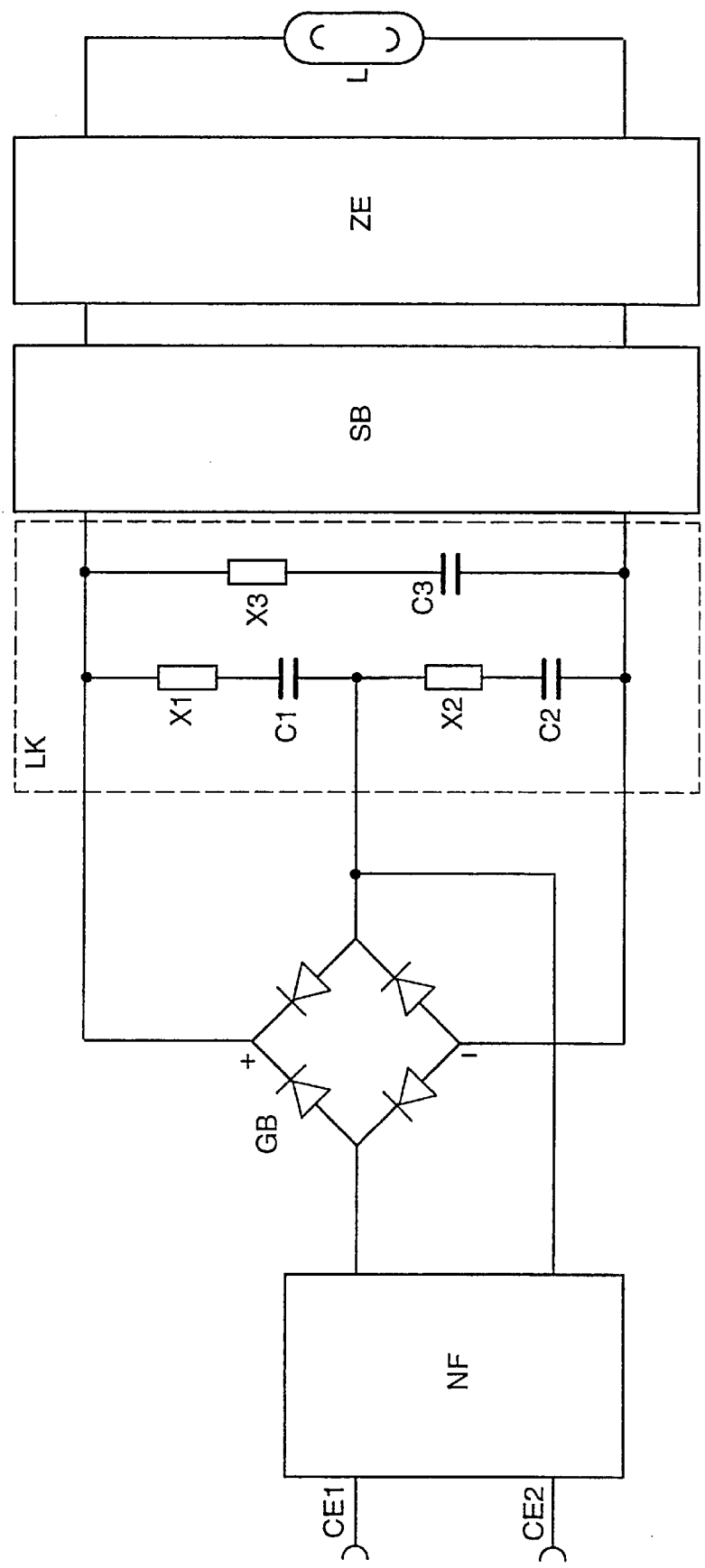

For the purpose of limiting the current (set in the transfer current) and the voltage, the capacitor C3 can also be provided with a series circuit of a current-limiting component (for example a resistor X3). This resistor X3 is shown in FIG. 4 together with resistors X1 and X2 which are assigned to the other partial capacitors C1 and C2 in the basic load circuit LK.

Figure 5:
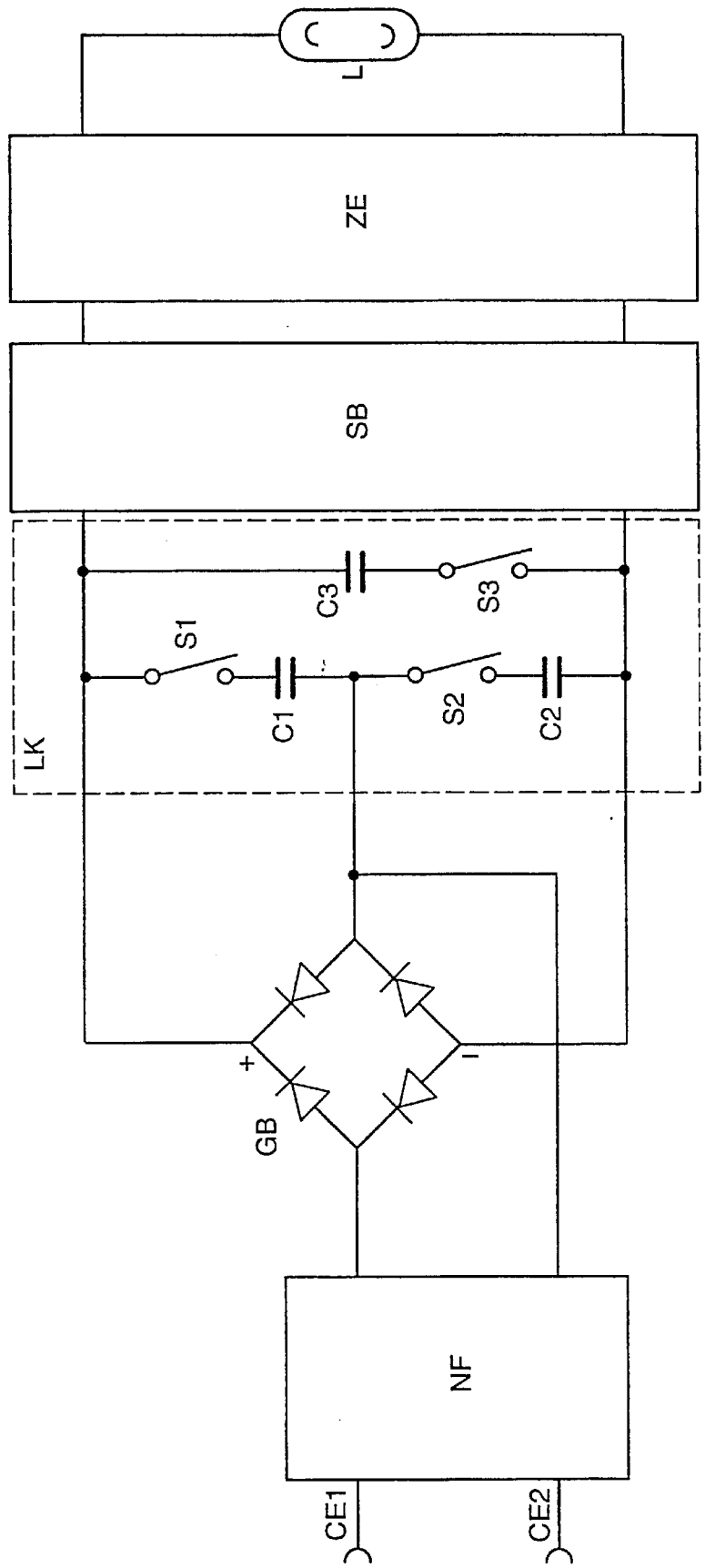

It is sensible in some circumstances for the capacitors in specific ballast operating states (for example for reducing the harmonic content after completed lamp transfer and/or ballast disconnection at the end of the lamp service life, etc.) to be disconnected from the current path. This can be done by connecting appropriate switching elements S1 to S3 in series with the partial capacitors C1 to C3, see FIG. 5. Thyristors, triacs and transistors are suitable as switching elements. These can also be used in combination.

Figure 6:
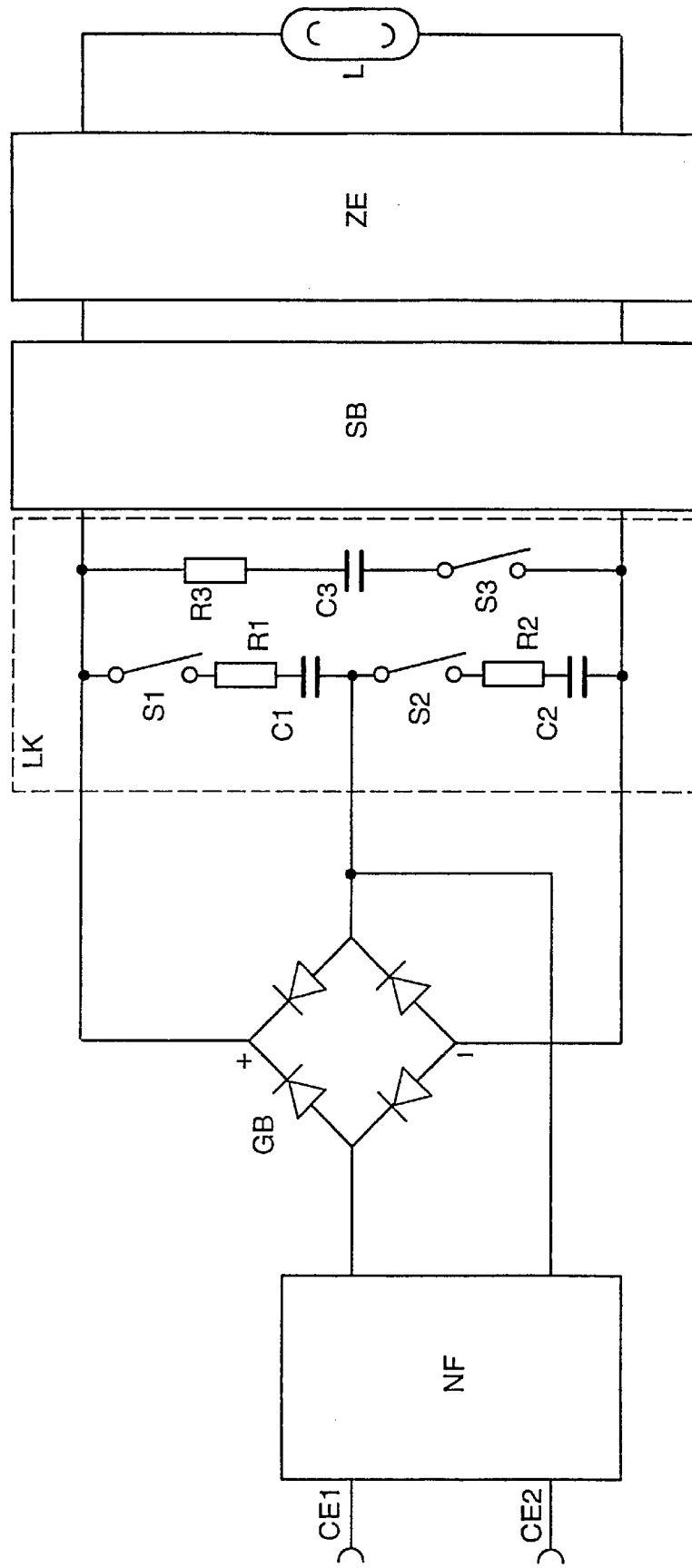

The switching elements S1 to S3 can also be used together with current-limiting components R1 to R3, see FIG. 6.

Figure 7:
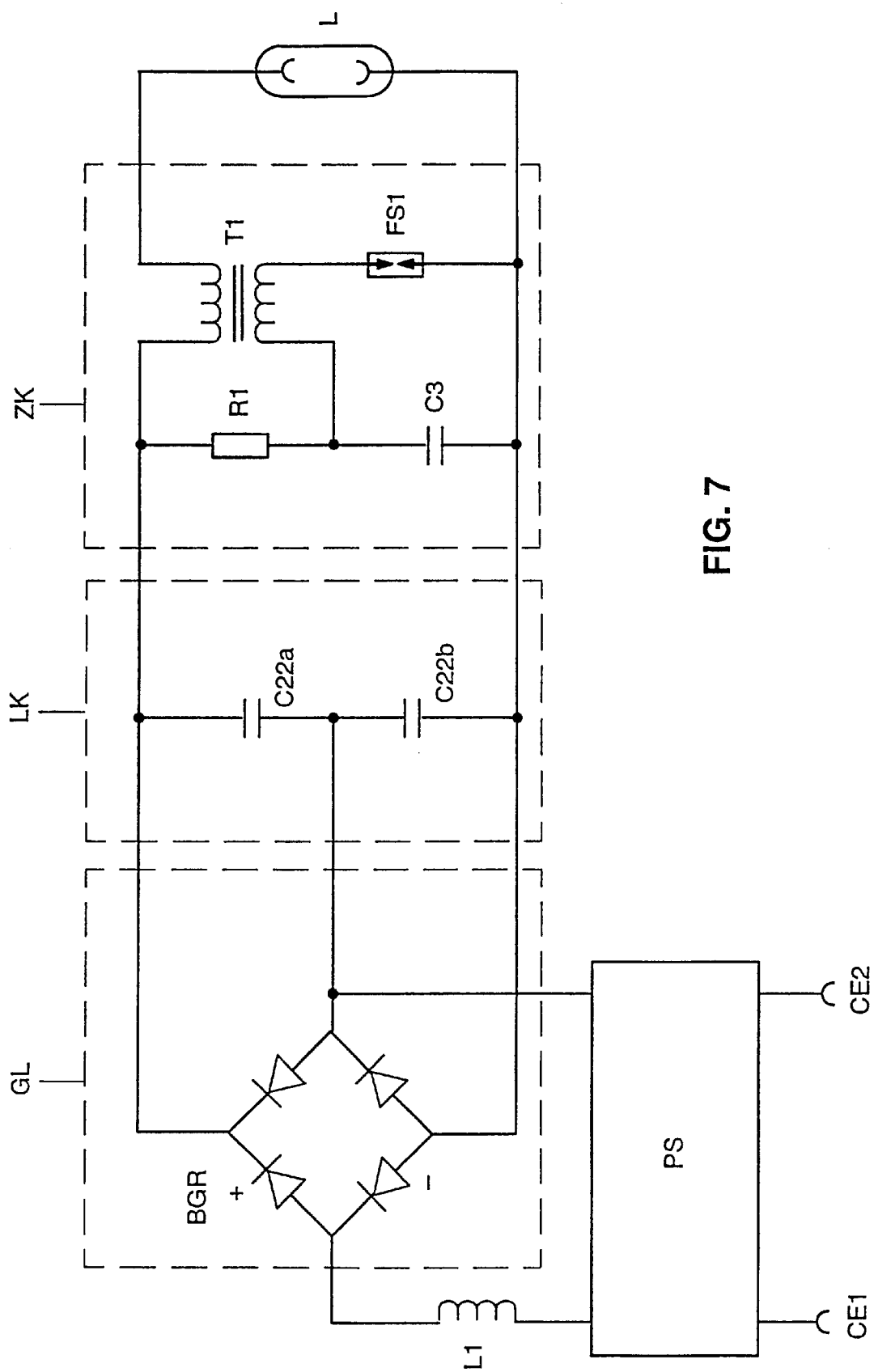

FIG. 7 shows a further exemplary embodiment with an appropriate voltage doppler connection for increasing the transfer voltage. In this arrangement, the current limitation is not performed in the dc circuit by means of a downstream half bridge or the like, but in the ac path, that is to say upstream of the rectifier unit GL by means of Grätz bridge rectifier BGR (for example, of type DB 1000). The customary ballast inductor L1 is used in this case. Moreover, it is possible to set the lamp power by means of a phase-gating control PS known per se (for example with a triac). The starting device ZK located in the dc path is designed as a superimposed circuit and in addition to the starting transformer T1 and a spark gap FS1 contains an RC network comprising R1 and C3.

With the lamp not started, C3 is charged via R1 by a charging circuit LK with the voltage dropping across C22*a* and C22*b* (voltage doubling). When the breakdown voltage of FS1 is reached, the latter fires and generates a starting pulse for the discharge lamp L by means of T1. The voltage of C22*a* and C22*b* (corresponding to double the peak network voltage) is now available between the electrodes of the discharge vessel.

The other components of this circuit correspond to those in the previous figures. The circuit arrangement in accordance with FIG. 7 permits simple starting and dc operation of discharge lamps such as can be applied, for example, in sodium high-pressure lamps without an amalgam-containing filling.

The two capacitors in the charging circuit (C22*a* and C22*b* or C1 and C2) typically have a capacitance of 0.68 µF.

What is claimed is:

1. A circuit arrangement for starting and for operating a high-pressure discharge lamp, having a starting network and an operating network including a current-limiting element, an increased transfer voltage being made available to the discharge lamp (L), wherein the increased transfer voltage is generated by voltage doubling at a rectifier unit (GB) by means of a charging capacitor (LK) separated into two individual partial capacitors (C1, C2), the common midpoint (M) of the two partial capacitors (C1, C2) being connected to one of the two network inputs of the rectifier unit (GB).

2. The circuit arrangement as claimed in claim 1, wherein the rectifier unit (GB) is a Gràtz circuit.

3. The circuit arrangement as claimed in claim 1, wherein the increased transfer voltage is at most double the rectified network ac voltage.

4. The circuit arrangement as claimed in claim 1, wherein an additional capacitor (C3) is inserted in parallel with the two partial capacitors (C1 and C2) such that one of its poles makes contact with the positive potential and the other pole makes contact with the negative potential of the intermediate circuit voltage $U_0$ at the output of the rectifier unit.

5. The circuit arrangement as claimed in claim 1, wherein a switching element (S1, S2, S3) is arranged in series with the respective partial capacitors (C1) and/or (C2) and/or the additional capacitor (C3) of the charging capacitor (LK).

6. The circuit arrangement as claimed in claim 5, wherein a thyristor and/or triac and/or transistor is/are used as switching element(s).

7. The circuit arrangement as claimed in claim 1, wherein at least one of the partial capacitors (C1) and/or C2) and/or the additional capacitor (C3) of the charging capacitor (LK) is connected in series with a current-limiting component (X1, X2, X3).

8. The circuit arrangement as claimed in claim 1, wherein as filling the high-pressure discharge lamp contains sodium and xenon with a very high cold filling pressure, in particular with at least one atm.

9. The circuit arrangement as claimed in claim 1, wherein the arrangement further contains a phase-gating control (PS), preferably by means of a triac or thyristor.

10. The circuit arrangement as claimed in claim 1, wherein the starting device is designed as a superimposed circuit.

11. The circuit arrangement as claimed in claim 1, wherein the current-limiting element is designed as a bridge circuit with a high-frequency inductor which is located downstream of a voltage doubler connection (LK).

12. The circuit arrangement as claimed in claim 1, wherein the arrangement has one or more current-limiting components (L1) upstream of the rectifier unit.

* * * * *